(12) United States Patent
Rolf

(10) Patent No.: US 7,711,609 B1
(45) Date of Patent: May 4, 2010

(54) SYSTEM AND METHOD FOR PLACING PRODUCTS OR SERVICES AND FACILITATING PURCHASE

(75) Inventor: Devon A. Rolf, Paola, KS (US)

(73) Assignee: GoFigure Media, LLC, Paola, KS (US)

( * ) Notice: Subject to any disclaimer, the term of this patent is extended or adjusted under 35 U.S.C. 154(b) by 534 days.

(21) Appl. No.: 11/485,695

(22) Filed: Jul. 13, 2006

(51) Int. Cl.
*G06Q 30/00* (2006.01)
(52) U.S. Cl. .......................................... 705/26
(58) Field of Classification Search .............. 705/26, 705/27
See application file for complete search history.

(56) References Cited

U.S. PATENT DOCUMENTS

| | | | |
|---|---|---|---|
| 6,144,944 A | 11/2000 | Kurtzman et al. | |
| 2001/0037205 A1 | 11/2001 | Joao | |
| 2002/0120935 A1* | 8/2002 | Huber et al. | 725/60 |
| 2002/0133453 A1 | 9/2002 | Rose | |
| 2002/0183059 A1 | 12/2002 | Noreen et al. | |
| 2003/0212759 A1 | 11/2003 | Wu | |

OTHER PUBLICATIONS

Interview Summary dated Jul. 30, 2009, in U.S. Appl. No. 11/485,701; Applicant: Rolf, Devon A.
Amendment and Interview Summary dated Jul. 29, 2009, in U.S. Appl. No. 11/485,701; Applicant: Rolf, Devon A.
Non-Final Office Action dated Apr. 16, 2009, in U.S. Appl. No. 11/485,701; Applicant: Rolf, Devon A.
U.S. Appl. No. 11/485,701, filed Jul. 13, 2006; Applicant: Rolf, Devon A.

* cited by examiner

*Primary Examiner*—Mila Airapetian
(74) *Attorney, Agent, or Firm*—Hovey Williams LLP

(57) ABSTRACT

A system and method for placing products or services within interactive television or radio programming or other programming, and for facilitating viewers' purchases thereof. The present invention allows viewers to mark and store placed products or services for later consideration or purchase; provides a virtual catalog entry showing such options as different colors, styles, or sizes, as may be appropriate given the nature of the product or service; identifies local or regional sources or providers of selected products or services; indicates availability and estimated delivery times for selected products or services; and allows for a greater variety of products and services to be placed.

14 Claims, 3 Drawing Sheets

SYSTEM AND METHOD FOR PLACING PRODUCTS OR SERVICES AND FACILITATING PURCHASE

BACKGROUND OF THE INVENTION

Field of the Invention

The present invention relates broadly to systems and methods for placing products or services and for facilitating purchase thereof. More specifically, the present invention concerns a system and method for placing products or services within interactive television, radio programming, downloadable or streamable video media, or other programming, and for facilitating viewers' purchases of such placed products or services.

SUMMARY OF THE INVENTION

The present invention provides a system and method for placing products or services within streaming media, media files made available for download from an online source, interactive television or radio programming or other programming, and for facilitating viewers' purchases thereof. More specifically, the present invention provides a number of advantageous features not found in the prior art, including allowing viewers to purchase products or services presented in media; providing a virtual catalog entry showing such options as different colors, styles, or sizes, as may be appropriate given the nature of the product; identifying local or regional sources or providers of viewer-selected products or services; indicating availability and estimated delivery times for selected products or services; and allowing for a greater variety of products and services to be placed.

In return for placement of its product or service, a manufacturer or other provider pays a fee to a source of the program in which the placement occurs. This fee may be fixed or variable, and may be based on the number of showings of the program or of the product or service within the program; on the number of product or service selections by viewers; on a percentage of monetary sales amounts; or on the number of actual sales.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENTS

Figure 1:
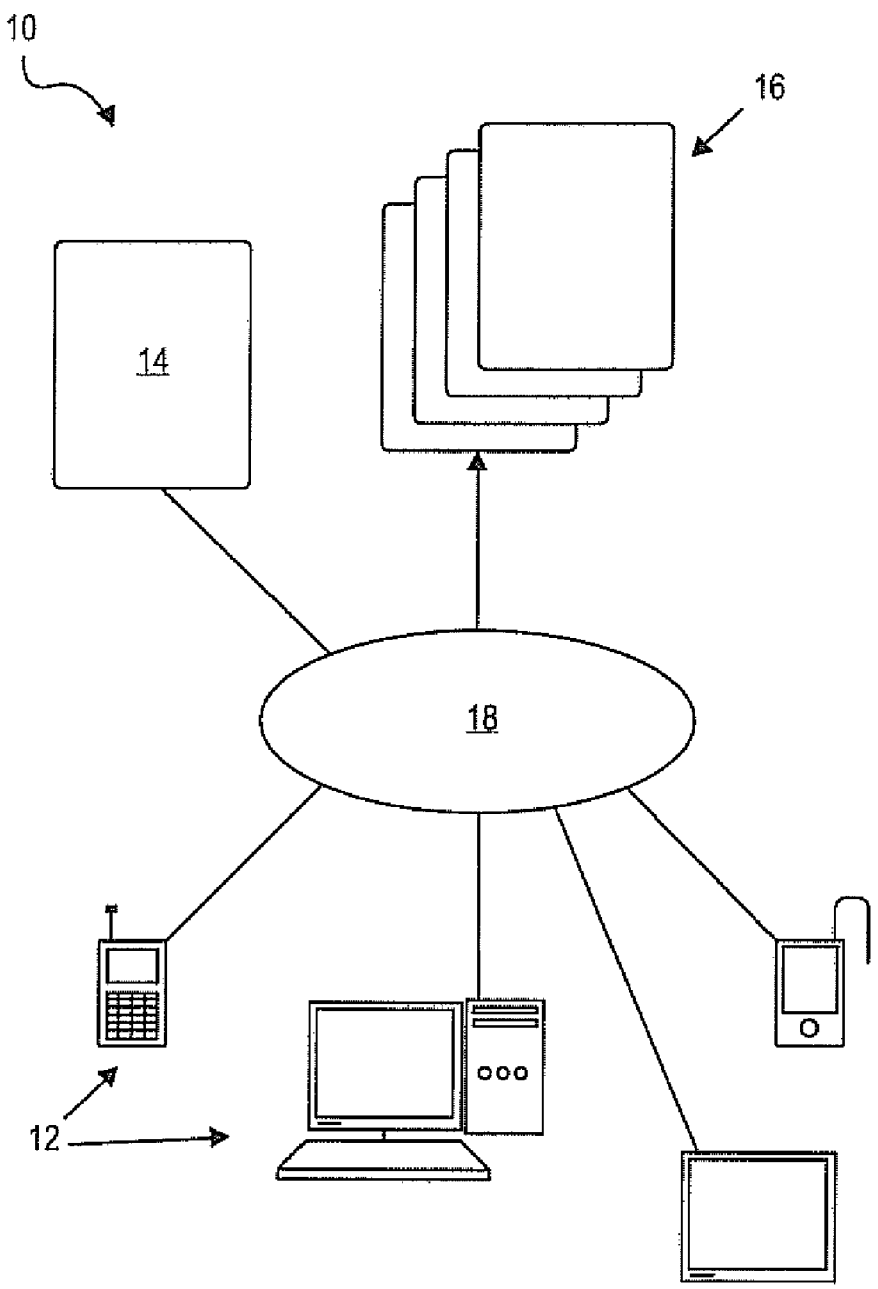
FIG. 1 is a system diagram of a preferred embodiment of a system of the present invention.

With reference to the figures, a system 10 and method is herein described, shown, and otherwise disclosed in accordance with the preferred embodiments of the present invention. Broadly, the system 10 and method allows for placing products or services within media. In one embodiment, product(s) or service(s) offered for sale are placed in digital media, such as digital video files, that are available for download or streaming. Such media may be broadcast, downloaded or streamed to a wide variety of devices 12, such as cellular telephones, personal computers, Internet-enabled televisions and satellite radio players. Accordingly, such media facilitates viewers' purchases of goods or services presented in the media. More specifically, the present invention provides a number of advantageous features not found in the prior art, including allowing viewers electronically link or frame to content related to a good or service presented in the media so that such goods or services may be purchased; providing a virtual catalog entry showing such options as different colors, styles, or sizes, as may be appropriate given the nature of the product or service; identifying local or regional sources or providers of selected products or services; indicating availability and estimated delivery times for selected products or services; and allowing for a greater variety of products and services to be advertised.

The present invention also provides a virtual catalog entry for a selected product or service showing such options as different colors, styles, or sizes, as may be appropriate given the nature of the product or service. In one contemplated embodiment, the catalog entry is provided as a separate window within the viewed program. The catalog may be limited to showing products or services previously presented or currently presented in the programming, or the catalog may allow viewers to see all products or services for that particular program, including those not yet presented.

The present invention also identifies local or regional sources or providers of selected products or services. This can be particularly important, for example, in cases where the product is time-sensitive, perishable, delicate, or requires special delivery methods, or where the service is one that must be provided by a nearby provider. For example: if the placed product is a food item, especially a common home-delivered food item, then the viewer's selection of the food item appearing in the show may spur a request for the viewer's address which is used to determine the closest provider of the food product.

The present invention also indicates availability and estimated delivery times for selected products or services. Purchasers can become frustrated when they are notified only after making a purchase that the desired product or service is not available or won't be delivered for a substantial amount of time.

The present invention also allows for a greater variety of products and services to be advertised. Rather than one or two products, such as, for example, an article of clothing worn or a vehicle driven by a cast member, the present invention allows for all or almost all items appearing in any given program to be available for purchase. These items may include such products as, for example, furniture, books, vehicles, plants, pets, food items, and electronics, and such services as, for example, landscaping, house-cleaning, hairstyling, and travel. The exact nature of the products or services being offered will depend greatly on the nature of the program; home improvement programs, for example, will likely offer substantially different products or services than dramatic fiction or non-fiction programs.

In return for placement of its product or service, a manufacturer or other provider pays a fee to a source of the program in which the placement occurs. This fee may be fixed or variable, and may be based on the number of showings of the program or of the product or service within the program; on the number of selections by viewers of the products or services; or on the number of actual sales.

Referring particularly to FIG. 1, the system 10 broadly comprises an electronic device 12; a programming or media source 14; a plurality of product or service providers 16; and a communication or programming distribution network 18. The electronic device 12 allows the viewer to view or hear the interactive programming and to select products or services placed therein by selecting, indicating, or otherwise activating an icon, button, prompt, or other device embedded in or otherwise associated with the programming. The electronic device 12 may be any of a number of different devices using any of a wide variety of technologies, such as, for example, a desktop or portable computing device for accessing the Internet, or an interactive (e.g., Internet enabled) television or radio (e.g., cellular telephone) for receiving programming.

The programming source 14 creates and/or transmits the programming for presentation on the device 12. The source 14 may be any of a number of different sources and source devices using any of a wide variety of technologies, such as, for example, a server for providing content via the Internet, or a provider of interactive television or radio programming.

The plurality of product or service providers 16 are simply those manufacturers or other providers who have contracted with the source 14 to have their products or services placed within the programming so as to be available for selection by the viewer.

The communication or programming distribution network 18 is any appropriate type of network for communicating programming from the source 14 to the device 12, and for communicating viewer interest or purchase information from the device 12 to the providers 16. As such, the network 18 may be or include any appropriate wired or wireless communication medium or combination thereof, such as, for example, the Internet, a cable-based network, or a transceiver-based system.

According to the invention, placement of products or services to sell within video typically will occur by formation of a relationship, such as a contractual relationship, between a provider of goods or services and the producer or provider of the video. As an example, a provider of clothing and apparel forms a relationship with a producer of video and clothing of the clothing provider is worn by actors and/or actresses in the video. This relationship may be established in a conventionally negotiated manner, or may include, at least in part, an on-line bidding process in which the provider of clothing bids up to an amount it is willing to pay (fixed fees and/or percentage on sales) to be included in the video.

Figure 2:
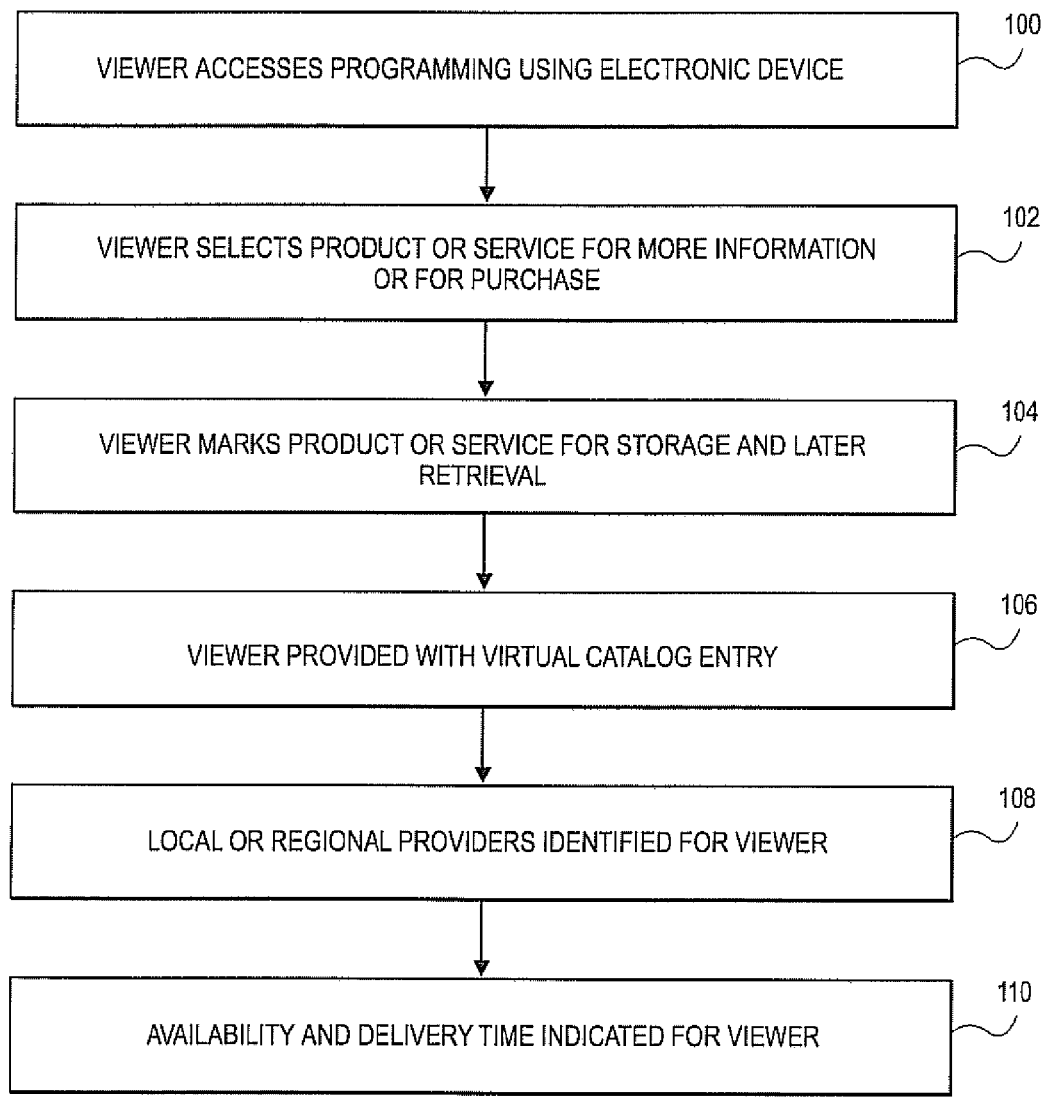
FIG. 2 is a flowchart of steps involved in practicing a preferred embodiment of the method of the present invention.

Referring to FIG. 2, exemplary operation and use of the present invention may proceed as follows. The viewer first accesses media or, as it may be termed, programming, such as digital video, using the electronic device 12, as depicted in box 100. The media may be streamed, downloaded or broadcast to the device 12. As will be appreciated, selection of the media may be in a conventional fashion in which the media is broadcast at a selected time, or may be selected for downloading or streaming at a time desired by the user. Included in the program's presentation are a variety of placed products or services. The viewer, wishing more information about or wishing to purchase a particular placed product or service selects that particular product or services, as depicted in box 102. Alternatively, the viewer may mark the product or service for storage and later recall at a more convenient time, as depicted in box 104. When the viewer does wish to view more information about or purchase the product or service, a virtual catalog entry may provided, as may be appropriate given the nature of the product or service, as depicted in box 106. Also depending on the nature of the product or service, local or regional sources or providers may be identified, as depicted in box 108, and availability and estimated delivery times may be indicated, as depicted in box 110. Via use of an online shopping card into which payment information is entered, the product is purchased.

Figure 3A:
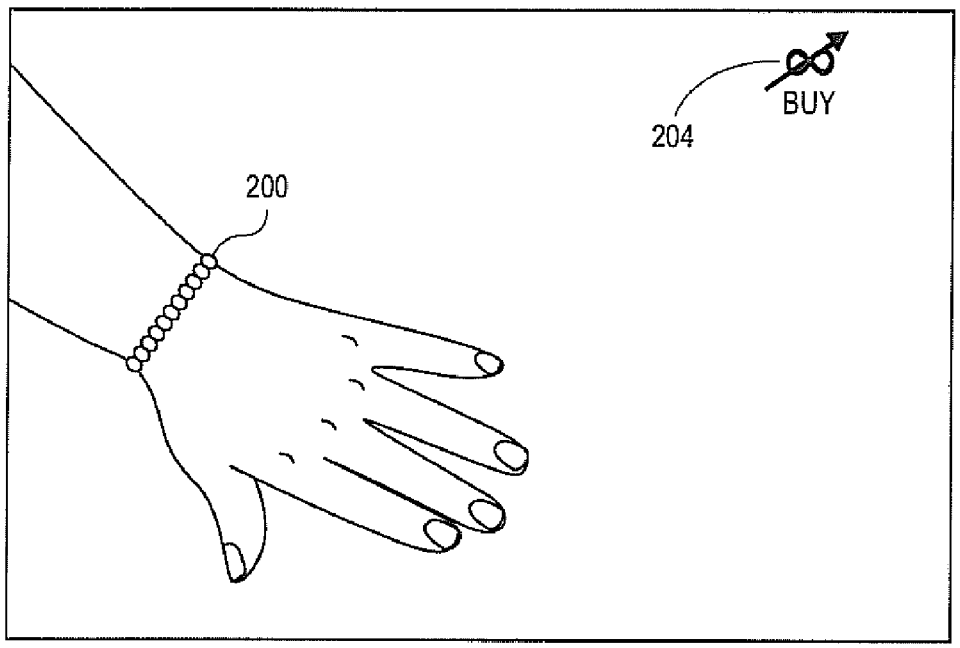
FIG. 3A and FIG. 3B are representative screen displays, respectively, showing a video display in which a product available for purchase (a bracelet) is presented and information concerning and the opportunity to purchase the product.
Figure 3B:
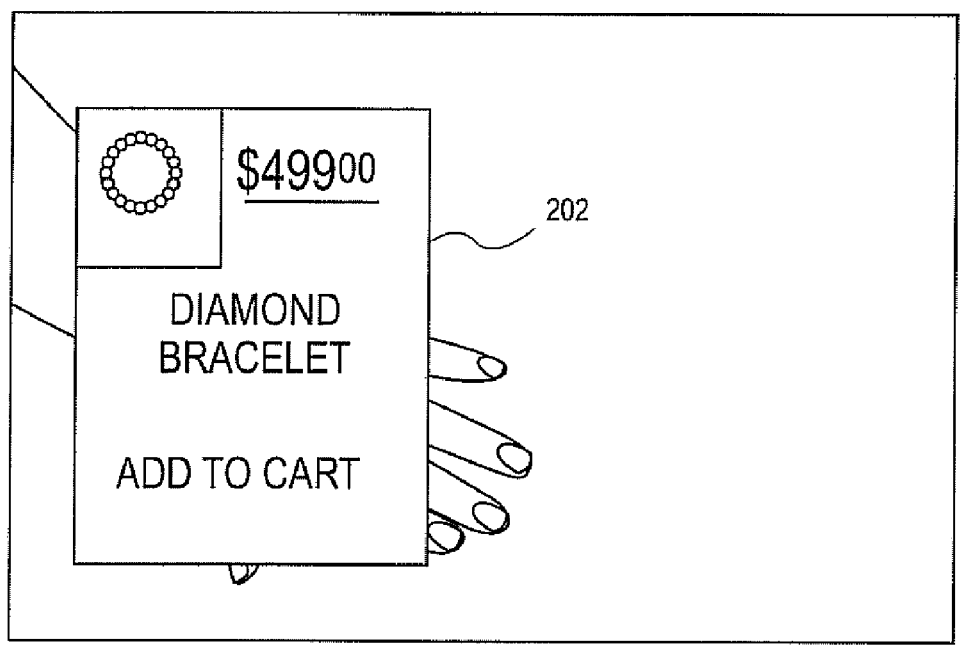

With reference to FIGS. 3A and 3B, as an example of use of the present invention, a video recording is made in which an actress in the video recording wears a bracelet 200 that is placed in the show by an associated merchant or retailer 16. A viewer viewing the video who desires to obtain more information about the bracelet 200 can activate a virtual icon or link to be linked or framed to a page containing information about, and an opportunity to purchase, the bracelet 200. The linking or framing may occur with source 14 or one of the providers 16, or with a separate site (not shown) established for this purpose. As shown in FIG. 3B, an informational window 202 that also presents the opportunity to purchase the bracelet 200 is presented as a picture-in-picture window over the original, now paused video. It will be understood that the window 202 could comprise the entire display screen of device 12 on which the information is viewed.

A purchase transaction may be accomplished in a conventional manner, with the purchaser providing identifying information (such as name, address, telephone number, email address, etc.) and payment information (such as a debit or credit account). A portion of the purchase price may be allocated back to source 12 or others within the system 10.

A symbol or icon 204 may be placed in some or all of those frames of the video which include an item that is available for purchase. Such an icon 204 alerts the viewer(s) that an item shown on the screen is available for purchase. Alternatively, the icon may be visibly present throughout the video, but is highlighted (by color, brightness, flashing, or otherwise) during those portions of the video when one or more items available for purchase are visibly displayed in the video.

An additional feature of the invention includes automatically activating a pause feature when the viewer enters a command to obtain more information or purchase an article or service presented in the video. Upon completion and exiting of the link or frame involving the information retrieval and/or purchase, the pause is released or a prompt is provided to the viewer to release the pause. Alternatively, rather than pausing the video. Alternatively, in the case of a broadcast signal, entry of a command to retrieve information or make a purchase automatically records the video so that viewing may pick-up from the point at which the command was entered upon conclusion of the information review and/or purchase.

From the foregoing, it will be seen that this invention is one well adapted to attain any and all ends and objects hereinabove set forth together with the other advantages which are obvious and which are inherent.

It will be understood that certain features and subcombinations are of utility and may be employed with reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A method comprising:

(a) communicating a video to a viewer, wherein products or services are placed within the program and are selectable by the viewer for obtaining further information or for purchasing, wherein said communicating a video to a viewer is performed by at least one electronic processor;

(b) presenting in the video an icon indicative of the fact that a product or service viewable in the video is available for purchase, wherein said presenting in the video an icon indicative of the fact that a product or service viewable in the video is available for purchase is performed by at least one electronic processor;

(c) receiving an input indicative of a particular product or service being selected by the viewer, wherein said receiving an input indicative of a particular product or service being selected by the viewer is performed by at least one electronic processor;

(d) in response to said receipt of an input indicative of a particular product or service being selected by the viewer, communicating for display a virtual catalog entry for the selected particular product or service, wherein said communicating for display a virtual catalog entry for the selected particular product or service is performed by at least one electronic processor; and (e) collecting a fee from a party associated with the placed product or service, wherein said fee is based on a bid received in an auction for the right to present the good or service being selected in said video.

2. The method as set forth in claim 1, wherein said fee is further based on the number of showings of the video.

3. The method as set forth in claim 1, wherein said fee is based upon the number of times said particular product or service being selected has been selected or purchased by viewers.

4. The method as set forth in claim 1, wherein said fee is further based upon a purchase of the product or service presented in the video.

5. The method as set forth in claim 1, wherein said fee is further based upon a selection of the product or service presented in the video.

6. The method as set forth in claim 1, wherein the video is communicated to the viewer via the Internet.

7. The method as set forth in claim 1, wherein the video is communicated to the viewer via an interactive television.

8. The method as set forth in claim 1, wherein the video is communicated to the viewer via an interactive radio.

9. The method as set forth in claim 1, further including the step of communicating the viewer's selection to a manufacturer or provider of the selected particular product or service, wherein said communicating the viewer's selection to a manufacturer or provider of the selected particular product or service employs at least one electronic processor.

10. The method as set forth in claim 1, wherein the fee is based on the video which contains the placed product or service being communicated to the viewer.

11. The method as set forth in claim 1, wherein the catalog entry is displayed as a window within the program.

12. The method as set forth in claim 1, wherein the catalog entry shows different options associated with the selected particular product or service.

13. The method as set forth in claim 1, wherein said video is downloaded for viewing, said method further comprising pausing said video upon receipt of a pause input, wherein said pausing said video employs at least one electronic processor.

14. A system for implementing the method of claim 1, wherein said system comprises an electronic device, a programming or media source, a product or service provider of the particular product or service presented in a video, and a communication or programming distribution network.

* * * * *